(12) United States Patent
Wood

(10) Patent No.: US 7,130,095 B1
(45) Date of Patent: Oct. 31, 2006

(54) CORRECTING FOR IMAGE DISTORTION IN IMAGE PROJECTORS

(75) Inventor: Frederick F. Wood, Medford, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 0 days.

(21) Appl. No.: 11/165,739

(22) Filed: Jun. 24, 2005

(51) Int. Cl.
*G02B 26/08* (2006.01)
(52) U.S. Cl. ............... 359/202; 359/201; 359/198; 359/204; 359/199; 348/746
(58) Field of Classification Search ............... None
See application file for complete search history.

(56) References Cited

U.S. PATENT DOCUMENTS 6,795,221 B1 * 9/2004 Urey .................... 359/199
6,832,724 B1 * 12/2004 Yavid et al. ............ 235/454

* cited by examiner

*Primary Examiner*—James Phan
(74) *Attorney, Agent, or Firm*—Kirchstein, et al.

(57) ABSTRACT

An arrangement for, and a method of, correcting for image distortion in an image projection system include making the scan lines of the projected image all of the same length by adjusting the amplitude of a drive signal used to sweep a laser beam to form each scan line of the image.

11 Claims, 8 Drawing Sheets

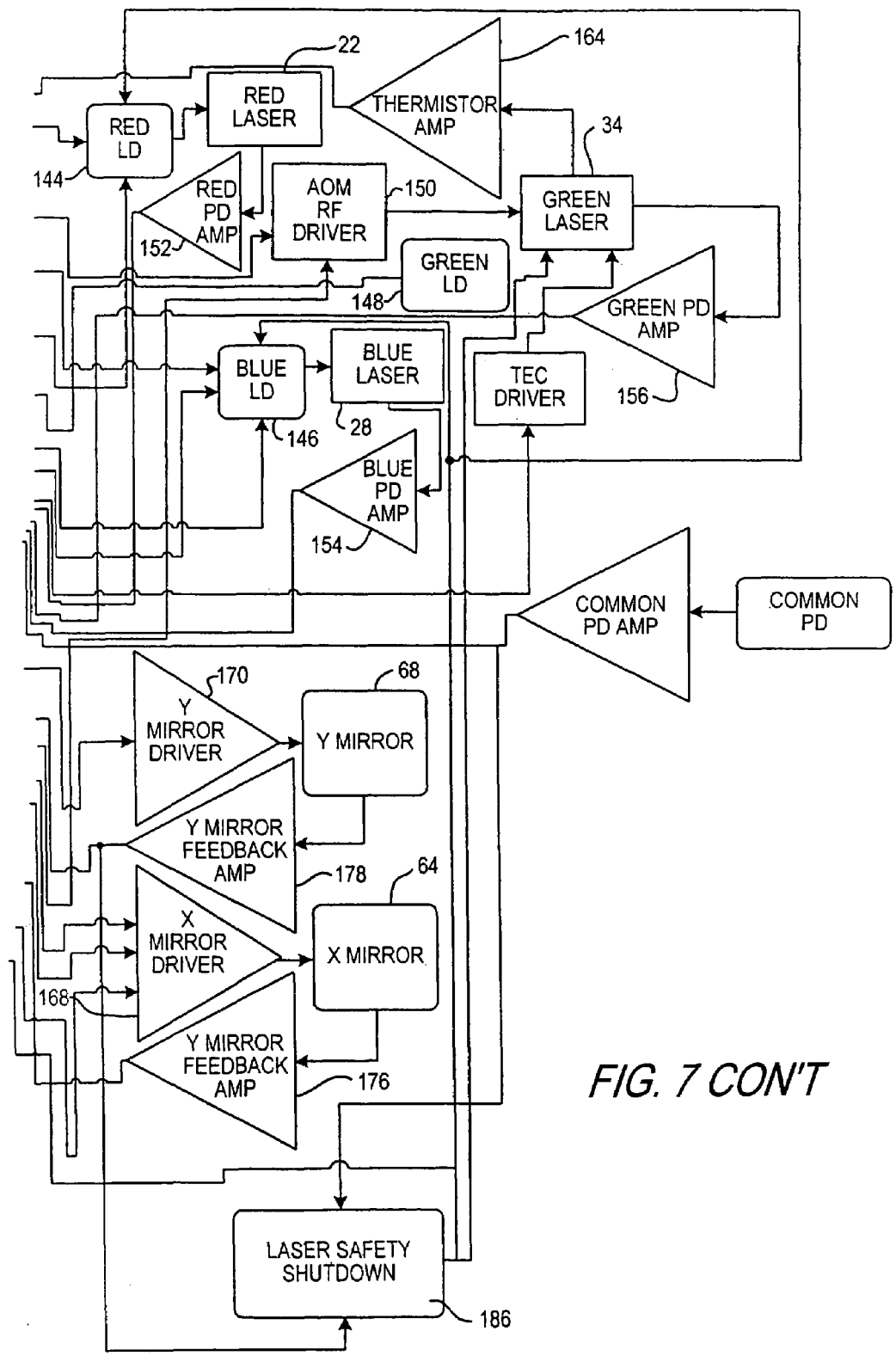
FIG. 7 CON'T

CORRECTING FOR IMAGE DISTORTION IN IMAGE PROJECTORS

BACKGROUND OF THE INVENTION

1. Field of the Invention

The present invention generally relates to projecting images onto a projection surface such as a screen or the like, and, more particularly, to correcting distortion of such images.

2. Description of the Related Art

It is generally known to project a two-dimensional image on a projection surface, such as a screen, based on oscillating a pair of scan mirrors in mutually orthogonal directions to scan a laser beam over a raster pattern of scan lines. However, the known image projection systems project the image with limited resolution, typically less than a fourth of video-graphics-array (VGA) quality of 640×480 pixels, and with some image distortion primarily caused by the orientation of the screen relative to the image projection system.

For example, when an image having a square or rectangular image area is projected on a tilted screen that is inclined relative to an optical axis along which the image is projected, then the projected image suffers a trapezoidal or quadrilateral distortion known in the art as a "keystone" distortion. In other words, there are scan lines located further away from the image projection system which are longer in length as compared to scan lines located closer to the image projection system.

As another example, the screen may be centrally oriented perpendicular to the optical axis of the image projection system. If the projection angle is very wide, then the scan lines at the top and at the bottom of the image area will be longer than the scan lines in the middle of the image area. This is generally known in the art as side-to-side or east-to-west "pincushion" distortion.

Such pincushion or keystone distortion is generally corrected in the art by electronically clipping or cropping triangular sections of the image area in order to make the image area square or rectangular. However, when this is done, the image resolution suffers due to the loss of usable pixels.

SUMMARY OF THE INVENTION

Objects of the Invention

Accordingly, it is a general object of this invention to reduce, if not eliminate, keystone and pincushion distortion by image projectors.

More particularly, it is an object of the present invention to project a non-distorted image with scan lines of the same length.

Still another object of the present invention is to correct for image distortion without loss of image resolution.

Features of the Invention

In keeping with the above objects and others which will become apparent hereinafter, one feature of the present invention resides, briefly stated, in an arrangement for, and a method of, correcting distortion of an image projected on a projection surface.

A laser is operative for emitting a laser beam of a certain wavelength. If the image to be projected is to be in color, then additional lasers for emitting laser beams of different wavelengths, for example, red. blue and green lasers, are employed, and their respective laser beams are co-linearly arranged into a composite beam.

A scanner is operative for sweeping the laser beam (or the composite beam) to form a raster pattern of scan lines. The scanner includes a first scan mirror for sweeping the laser beam along a first scan direction to form a scan line on the projection surface, and a second scan mirror for sweeping the scan line along a second scan direction perpendicular to the first scan direction to form the raster pattern. The scan lines have different lengths as considered along the first scan direction due to different distances traveled by the laser beam between the second scan mirror and the projection surface. Each scan line has a number of pixels arranged along the first scan direction.

A drive circuit is operative for driving the first scan mirror with a drive signal having an amplitude. Preferably, the drive circuit oscillates the first scan mirror in opposite circumferential directions over a first scan angle.

In accordance with this invention, a feedback circuit is provided for determining the amplitude of the drive signal for each scan line. A controller, preferably a programmed microprocessor, is operative for causing selected pixels to be illuminated, and rendered visible, by the laser beam to produce the image and, in further accordance with this invention, for adjusting the amplitude of the drive signal and, in turn, the first scan angle, for each scan line to produce the scan lines of the image with the same length, thereby correcting for image distortion. A user input interface can be employed to enable a viewer to manually adjust the lengths of the scan lines.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

DETAILED DESCRIPTION OF THE PREFERRED EMBODIMENTS

Figures 1, 2:
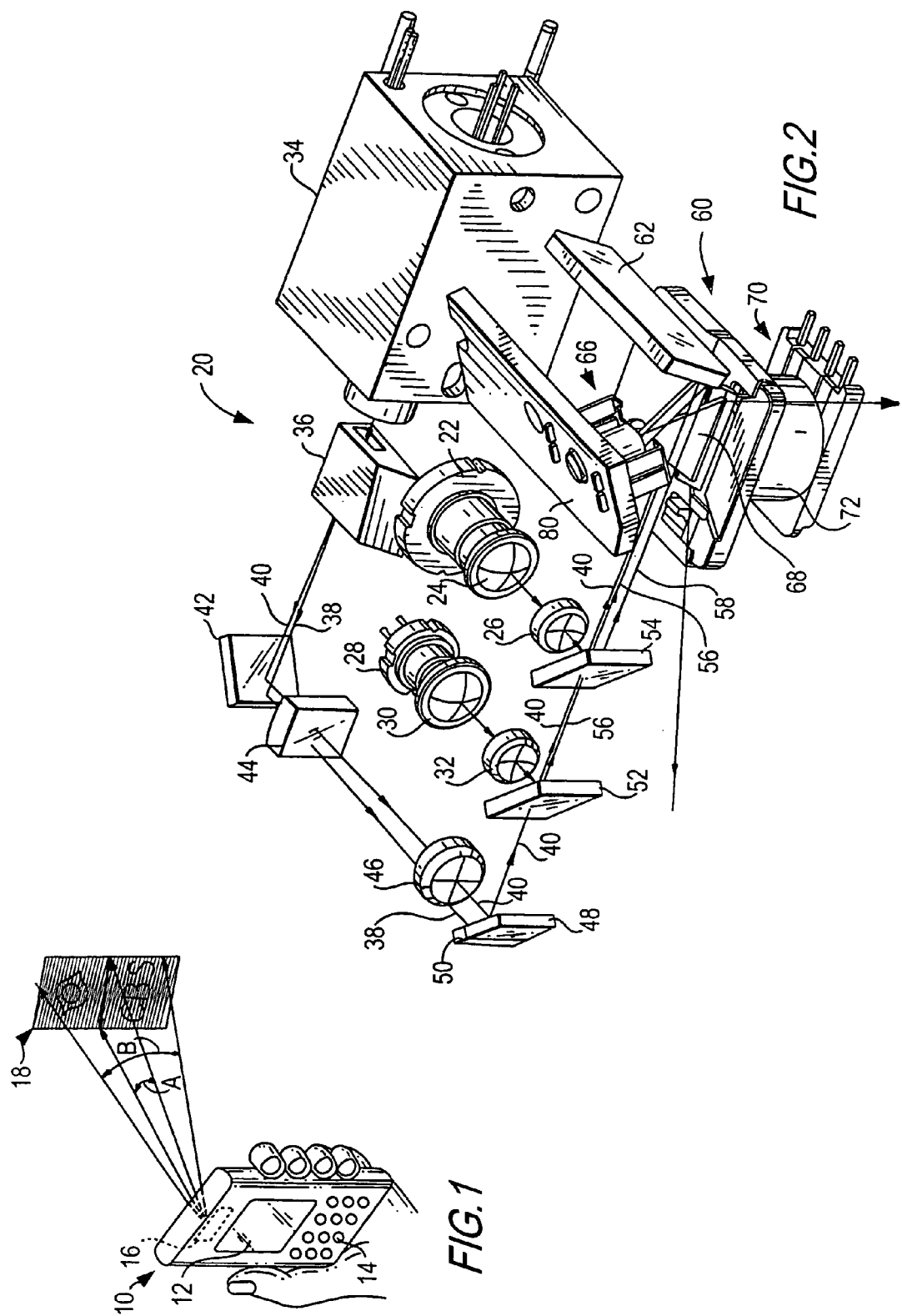
FIG. 1 is a perspective view of a hand-held instrument projecting a non-distorted image at a working distance therefrom.
FIG. 2 is an enlarged, overhead, perspective view of an image projection arrangement for installation in the instrument of FIG. 1.

Reference numeral 10 in FIG. 1 generally identifies a hand-held instrument, for example, a personal digital assistant, in which a lightweight, compact, image projection arrangement 20, as shown in FIG. 2, is mounted and operative for projecting a two-dimensional color non-distorted image at a variable distance from the instrument. By way of example, an image 18 is situated within a working range of distances relative to the instrument 10.

As shown in FIG. 1, the non-distorted image 18 extends over an optical horizontal scan angle A extending along the horizontal direction, and over an optical vertical scan angle B extending along the vertical direction, of the image. As described below, the image is comprised of illuminated and non-illuminated pixels on a raster pattern of scan lines swept by a scanner in the arrangement 20.

The parallelepiped shape of the instrument 10 represents just one form factor of a housing in which the arrangement 20 may be implemented. The instrument can be shaped as a pen, a cellular telephone, a clamshell or a wristwatch. In the preferred embodiment, the arrangement 20 measures less than about 30 cubic centimeters in volume. This compact, miniature size allows the arrangement 20 to be mounted in housings of many diverse shapes, large or small, portable or stationary, including some having an on-board display 12, a keypad 14, and a window 16 through which the image is projected.

Figure 3:
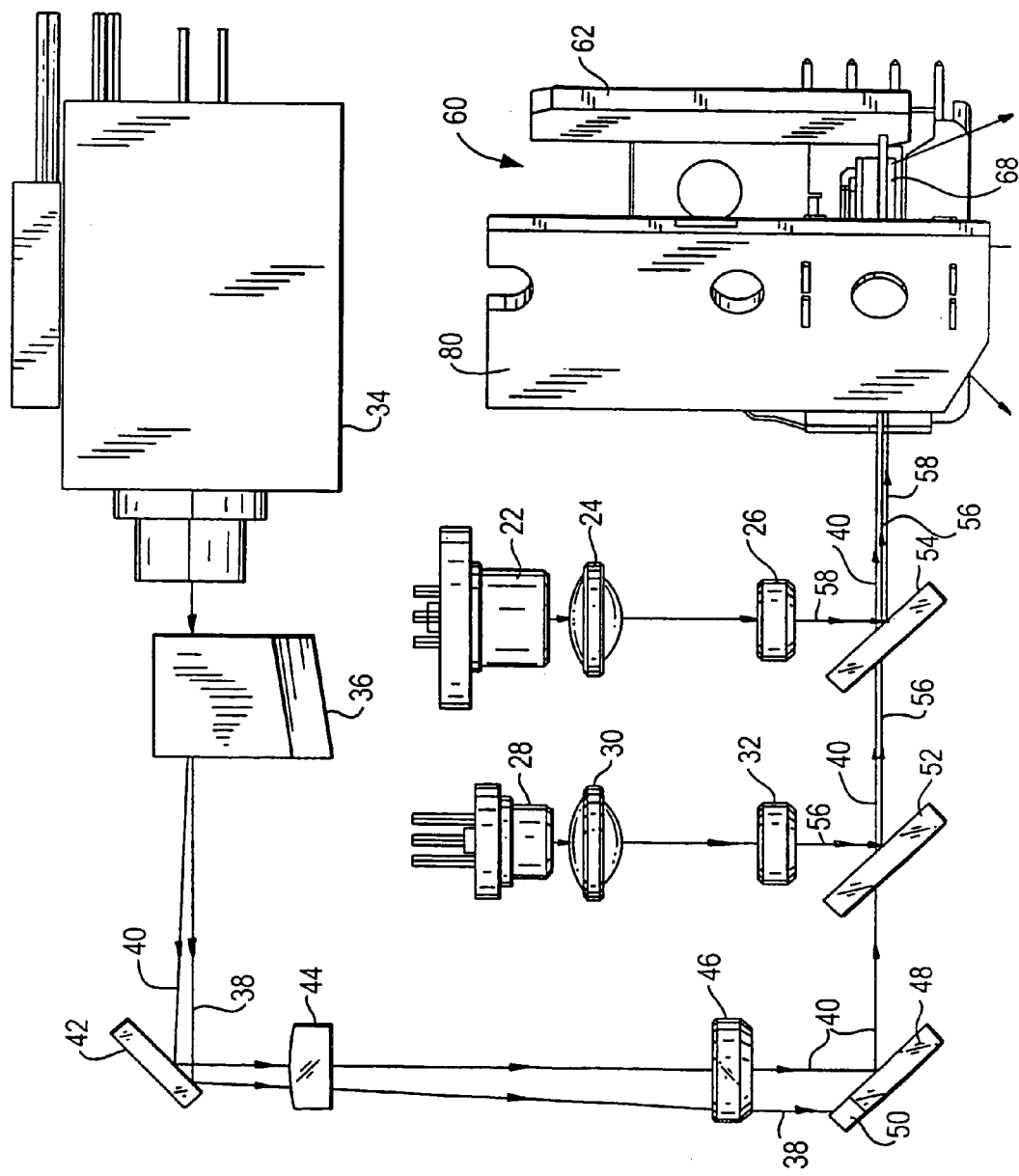
FIG. 3 is a top plan view of the arrangement of FIG. 2.

Referring to FIGS. 2 and 3, the arrangement 20 includes a semiconductor laser 22 which, when energized, emits a bright red laser beam at about 635–655 nanometers. Lens 24 is a biaspheric convex lens having a positive focal length and is operative for collecting virtually all the energy in the red beam and for producing a diffraction-limited beam. Lens 26 is a concave lens having a negative focal length. Lenses 24, 26 are held by non-illustrated respective lens holders apart on a support (not illustrated in FIG. 2 for clarity) inside the instrument 10. The lenses 24, 26 shape the red beam profile over the working distance.

Another semiconductor laser 28 is mounted on the support and, when energized, emits a diffraction-limited blue laser beam at about 475–505 nanometers. Another biaspheric convex lens 30 and a concave lens 32 are employed to shape the blue beam profile in a manner analogous to lenses 24, 26.

A green laser beam having a wavelength on the order of 530 nanometers is generated not by a semiconductor laser, but instead by a green module 34 having an infrared diode-pumped YAG crystal laser whose output beam is 1060 nanometers. A non-linear frequency doubling crystal is included in the infrared laser cavity between the two laser mirrors. Since the infrared laser power inside the cavity is much larger than the power coupled outside the cavity, the frequency doubler is more efficient in generating the double frequency green light inside the cavity. The output mirror of the laser is reflective to the 1060 nm infrared radiation, and transmissive to the doubled 530 nm green laser beam. Since the correct operation of the solid-state laser and frequency doubler require precise temperature control, a semiconductor device such as a thermo-electric cooler relying on the Peltier effect is used to control the temperature of the green laser module. The thermoelectric cooler can either heat or cool the device depending on the polarity of the applied current. A thermistor is part of the green laser module in order to monitor its temperature. The readout from the thermistor is fed to the controller, which adjusts the control current to the thermo-electric cooler accordingly.

As explained below, the lasers are pulsed in operation at frequencies on the order of 100 MHz. The red and blue semiconductor lasers 22, 28 can be pulsed at such high frequencies, but the currently available green solid-state lasers cannot. As a result, the green laser beam exiting the green module 34 is pulsed with an acousto-optical modulator (AOM) 36 which creates an acoustic standing wave inside a crystal for diffracting the green beam. The AOM 36, however, produces a zero-order, non-diffracted beam 38 and a first-order, pulsed, diffracted beam 40. The beams 38, 40 diverge from each other and, in order to separate them to eliminate the undesirable zero-order beam 38, the beams 38, 40 are routed along a long, folded path having a folding mirror 42. Alternatively, the AOM can be used either externally or internally to the green laser module to pulse the green laser beam. Other possible ways to modulate the green laser beam include electro-absorption modulation, or Mach-Zender interferometer. The AOM is shown schematically in FIG. 2.

The beams 38, 40 are routed through positive and negative lenses 44, 46. However, only the diffracted green beam 40 is allowed to impinge upon, and reflect from, the folding mirror 48. The non-diffracted beam 38 is absorbed by an absorber 50, preferably mounted on the mirror 48.

The arrangement includes a pair of dichroic filters 52, 54 arranged to make the green, blue and red beams as co-linear as possible before reaching a scanning assembly 60. Filter 52 allows the green beam 40 to pass therethrough, but the blue beam 56 from the blue laser 28 is reflected by the interference effect. Filter 54 allows the green and blue beams 40, 56 to pass therethrough, but the red beam 58 from the red laser 22 is reflected by the interference effect.

Figure 4:
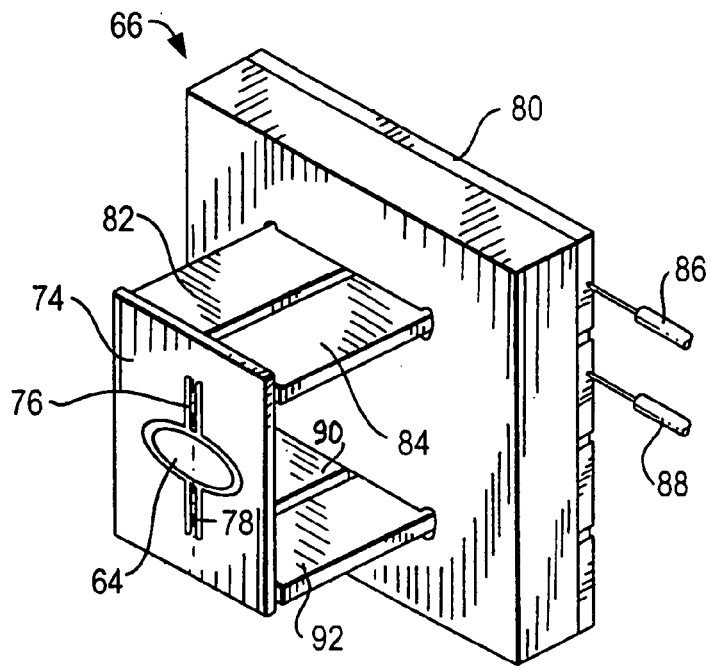
FIG. 4 is a perspective front view of an inertial drive for use in the arrangement of FIG. 2.

The nearly co-linear beams 40, 56, 58 are directed to, and reflected off, a stationary bounce mirror 62. The scanning assembly 60 includes a first scan mirror 64 oscillatable by an inertial drive 66 (shown in isolation in FIGS. 4–5) at a first scan rate to sweep the laser beams reflected off the bounce mirror 62 over the first horizontal scan angle A, and a second scan mirror 68 oscillatable by an electromagnetic drive 70 at a second scan rate to sweep the laser beams reflected off the first scan mirror 64 over the second vertical scan angle B. In a variant construction, the scan mirrors 64, 68 can be replaced by a single two-axis mirror.

The inertial drive 66 is a high-speed, low electrical power-consuming component. Details of the inertial drive can be found in U.S. patent application Ser. No. 10/387,878, filed Mar. 13, 2003, assigned to the same assignee as the instant application, and incorporated herein by reference thereto. The use of the inertial drive reduces power consumption of the scanning assembly 60 to less than one watt and, in the case of projecting a color image, as described below, to less than ten watts.

The drive 66 includes a movable frame 74 for supporting the scan mirror 64 by means of a hinge that includes a pair of co-linear hinge portions 76, 78 extending along a hinge axis and connected between opposite regions of the scan mirror 64 and opposite regions of the frame. The frame 74 need not surround the scan mirror 64, as shown.

The frame, hinge portions and scan mirror are fabricated of a one-piece, generally planar, silicon substrate which is approximately 150μ thick. The silicon is etched to form omega-shaped slots having upper parallel slot sections, lower parallel slot sections, and U-shaped central slot sections. The scan mirror 64 preferably has an oval shape and is free to move in the slot sections. In the preferred embodiment, the dimensions along the axes of the oval-shaped scan mirror measure 749μ×1600μ. Each hinge portion measure 27μ in width and 1130μ in length. The frame has a rectangular shape measuring 3100μ in width and 4600μ in length.

The inertial drive is mounted on a generally planar, printed circuit board 80 and is operative for directly moving the frame and, by inertia, for indirectly oscillating the scan mirror 64 about the hinge axis. One embodiment of the inertial drive includes a pair of piezoelectric transducers 82, 84 extending perpendicularly of the board 80 and into contact with spaced apart portions of the frame 74 at either side of hinge portion 76. An adhesive may be used to insure a permanent contact between one end of each transducer and each frame portion. The opposite end of each transducer projects out of the rear of the board 80 and is electrically connected by wires 86, 88 to a periodic alternating voltage source (not shown).

In use, the periodic signal applies a periodic drive voltage to each transducer and causes the respective transducer to alternatingly extend and contract in length. When transducer 82 extends, transducer 84 contracts, and vice versa, thereby simultaneously pushing and pulling the spaced apart frame portions and causing the frame to twist about the hinge axis. The drive voltage has a frequency corresponding to the resonant frequency of the scan mirror. The scan mirror is moved from its initial rest position until it also oscillates about the hinge axis at the resonant frequency. In a preferred embodiment, the frame and the scan mirror are about 150μ thick, and the scan mirror has a high Q factor. A movement on the order of 1μ by each transducer can cause oscillation of the scan mirror at scan rates in excess of 20 kHz.

Another pair of piezoelectric transducers 90,92 extends perpendicularly of the board 80 and into permanent contact with spaced apart portions of the frame 74 at either side of hinge portion 78. Transducers 90, 92 serve as feedback devices to monitor the oscillating movement of the frame and to generate and conduct electrical feedback signals along wires 94, 96 to a feedback control circuit (not shown in FIG. 5).

Alternately, instead of using piezo-electric transducers 90, 92 for feedback, magnetic feedback can be used, where a magnet is mounted on the back of the high-speed mirror, and an external coil is used to pickup the changing magnetic field generated by the oscillating magnet.

Although light can reflect off an outer surface of the scan mirror, it is desirable to coat the surface of the mirror 64 with a specular coating made of gold, silver, aluminum, or a specially designed highly reflective dielectric coating.

The electromagnetic drive 70 includes a permanent magnet jointly mounted on and behind the second scan mirror 68, and an electromagnetic drive coil 72 operative for generating a periodic magnetic field in response to receiving a periodic drive signal. The drive coil 72 is adjacent the magnet so that the periodic field magnetically interacts with the permanent field of the magnet and causes the magnet and, in turn, the second scan mirror 68 to oscillate.

The inertial drive 66 oscillates the scan mirror 64 at a high speed at a scan rate preferably greater than 5 kHz and, more particularly, on the order of 18 kHz or more. This high scan rate is at an inaudible frequency, thereby minimizing noise and vibration. The electromagnetic drive 70 oscillates the scan mirror 68 at a slower scan rate on the order of 40 Hz which is fast enough to allow the image to persist on a human eye retina without excessive flicker.

The faster mirror 64 sweeps a horizontal scan line, and the slower mirror 68 sweeps the horizontal scan line vertically, thereby creating a raster pattern which is a grid or sequence of roughly parallel scan lines from which the image is constructed. Each scan line has a number of pixels. The image resolution is preferably XGA quality of 1024×768 pixels. Over a limited working range, a high-definition television standard, denoted 720p, 1270×720 pixels can be displayed. In some applications, a one-half VGA quality of 320×480 pixels, or one-fourth VGA quality of 320×240 pixels, is sufficient. At minimum, a resolution of 160×160 pixels is desired.

The roles of the mirrors 64, 68 could be reversed so that mirror 68 is the faster, and mirror 64 is the slower. Mirror 64 can also be designed to sweep the vertical scan line, in which event, mirror 68 would sweep the horizontal scan line. Also, the inertial drive can be used to drive the mirror 68. Indeed, either mirror can be driven by an electromechanical, electrical, mechanical, electrostatic, magnetic, or electromagnetic drive.

The slow-mirror is operated in a constant velocity sweep-mode during which time the image is displayed. During the mirror's return, the mirror is swept back into the initial position at its natural frequency, which is significantly higher. During the mirror's return trip, the lasers can be powered down in order to reduce the power consumption of the device.

Figure 6:
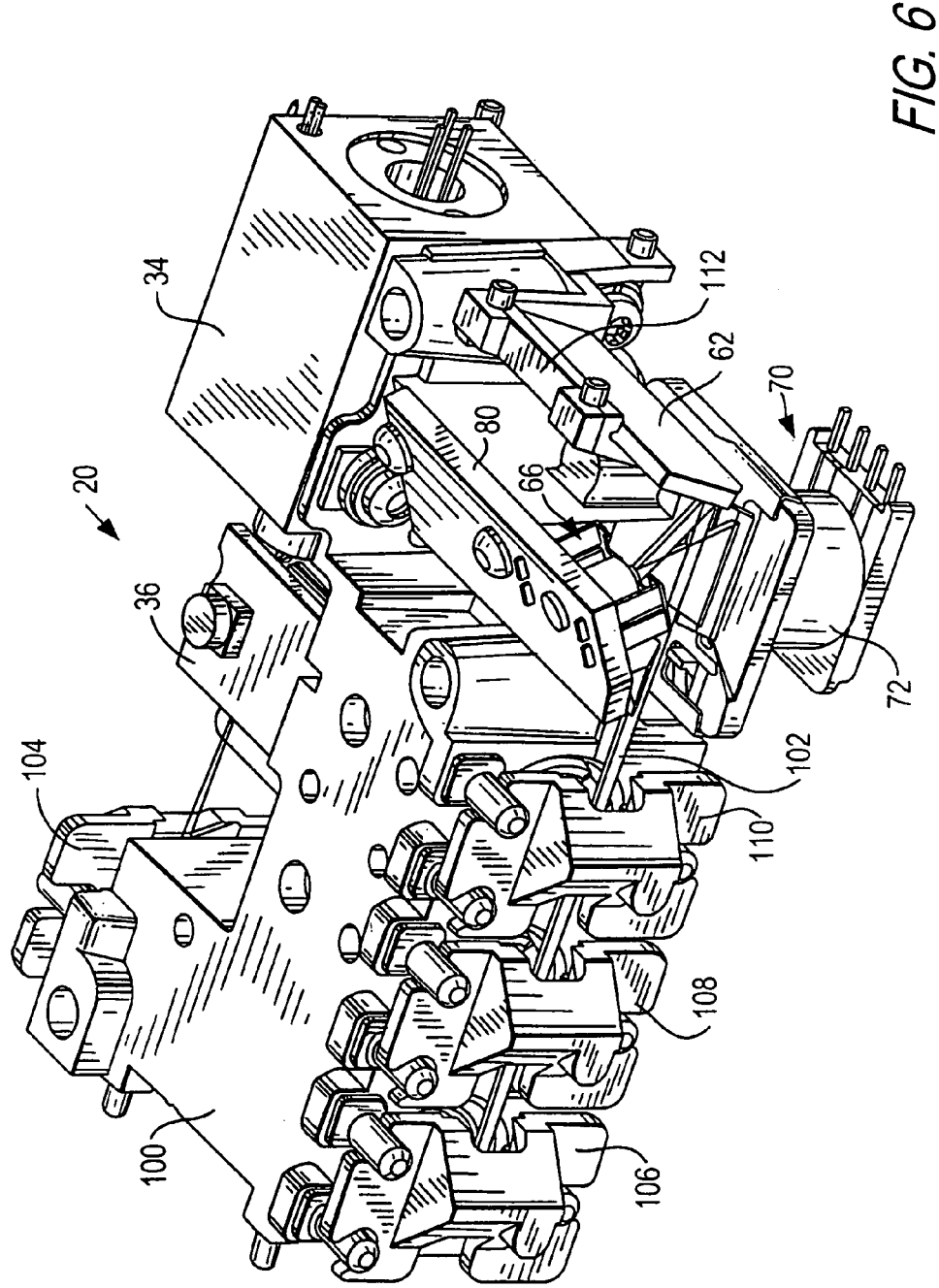
FIG. 6 is a perspective view of a practical implementation of the arrangement of FIG. 2.

FIG. 6 is a practical implementation of the arrangement 20 in the same perspective as that of FIG. 2. The aforementioned components are mounted on a support which includes a top cover 100 and a support plate 102. Holders 104, 106, 108, 110, 112 respectively hold folding mirrors 42, 48, filters 52, 54 and bounce mirror 62 in mutual alignment. Each holder has a plurality of positioning slots for receiving positioning posts stationarily mounted on the support. Thus, the mirrors and filters are correctly positioned. As shown, there are three posts, thereby permitting two angular adjustments and one lateral adjustment. Each holder can be glued in its final position.

The image is constructed by selective illumination of the pixels in one or more of the scan lines. As described below in greater detail with reference to FIG. 7, a controller 114 causes selected pixels in the raster pattern to be illuminated, and rendered visible, by the three laser beams. For example, red, blue and green power controllers 116, 118, 120 respectively conduct electrical currents to the red, blue and green lasers 22, 28, 34 to energize the latter to emit respective light beams at each selected pixel, and do not conduct electrical currents to the red, blue and green lasers to deenergize the latter to non-illuminate the other non-selected pixels. The resulting pattern of illuminated and non-illuminated pixels comprise the image, which can be any display of human- or machine-readable information or graphic.

Referring to FIG. 1, the raster pattern is shown in an enlarged view. Starting at an end point, the laser beams are swept by the inertial drive along the horizontal direction at the horizontal scan rate to an opposite end point to form a scan line. Thereupon, the laser beams are swept by the electromagnetic drive 70 along the vertical direction at the vertical scan rate to another end point to form a second scan line. The formation of successive scan lines proceeds in the same manner.

The image is created in the raster pattern by energizing or pulsing the lasers on and off at selected times under control of the microprocessor 114 or control circuit by operation of the power controllers 116, 118, 120. The lasers produce visible light and are turned on only when a pixel in the desired image is desired to be seen. The color of each pixel is determined by one or more of the colors of the beams. Any color in the visible light spectrum can be formed by the selective superimposition of one or more of the red, blue, and green lasers. The raster pattern is a grid made of multiple pixels on each line, and of multiple lines. The image is a bit-map of selected pixels. Every letter or number, any graphical design or logo, and even machine-readable bar code symbols, can be formed as a bit-mapped image.

Figure 7:
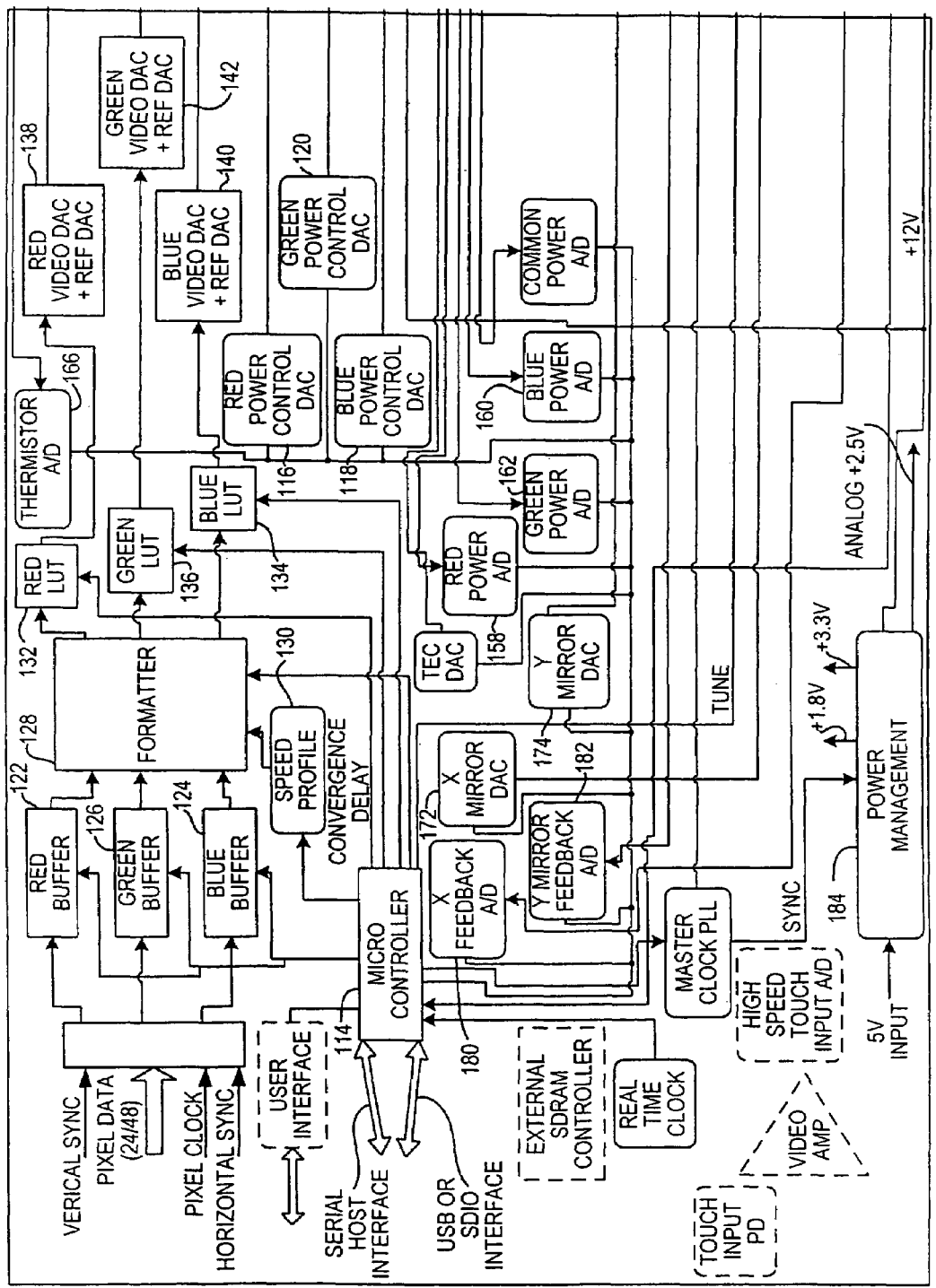
FIG. 7 is an electrical schematic block diagram depicting operation of the arrangement of FIG. 2.

As shown in FIG. 7, an incoming video signal having vertical and horizontal synchronization data, as well as pixel and clock data, is sent to red, blue and green buffers 122, 124, 126 under control of the microprocessor 114. The storage of one full VGA frame requires many kilobytes, and it would be desirable to have enough memory in the buffers for two full frames to enable one frame to be written, while another frame is being processed and projected. The buffered data is sent to a formatter 128 under control of a speed profiler 130 and to red, blue and green look up tables (LUTs) 132, 134, 136 to correct inherent internal distortions caused by scanning, as well as geometrical distortions caused by the angle of the display of the projected image. The resulting red, blue and green digital signals are converted to red, blue and green analog signals by digital to analog converters (DACs) 138, 140, 142. The red and blue analog signals are fed to red and blue laser drivers (LDs) 144, 146 which are also connected to the red and blue power controllers 116, 118. The green analog signal is fed to the AOM radio frequency (RF) driver 150 and, in turn, to the green laser 34 which is also connected to a green LD 148 and to the green power controller 120.

Feedback controls are also shown in FIG. 7, including red, blue and green photodiode amplifiers 152, 154, 156 connected to red, blue and green analog-to-digital (A/D) converters 158, 160, 162 and, in turn, to the microprocessor 114. Heat is monitored by a thermistor amplifier 164 connected to an A/D converter 166 and, in turn, to the microprocessor.

The scan mirrors 64, 68 are driven by drivers 168, 170 which are fed analog drive signals from DACs 172, 174 which are, in turn, connected to the microprocessor. Feedback amplifiers 176, 178 detect the position of the scan mirrors 64, 68, and are connected to feedback A/Ds 180, 182 and, in turn, to the microprocessor.

A power management circuit 184 is operative to minimize power while allowing fast on-times, preferably by keeping the green laser on all the time, and by keeping the current of the red and blue lasers just below the lasing threshold.

A laser safety shut down circuit 186 is operative to shut the lasers off if either of the scan mirrors 64, 68 is detected as being out of position.

Figure 8:
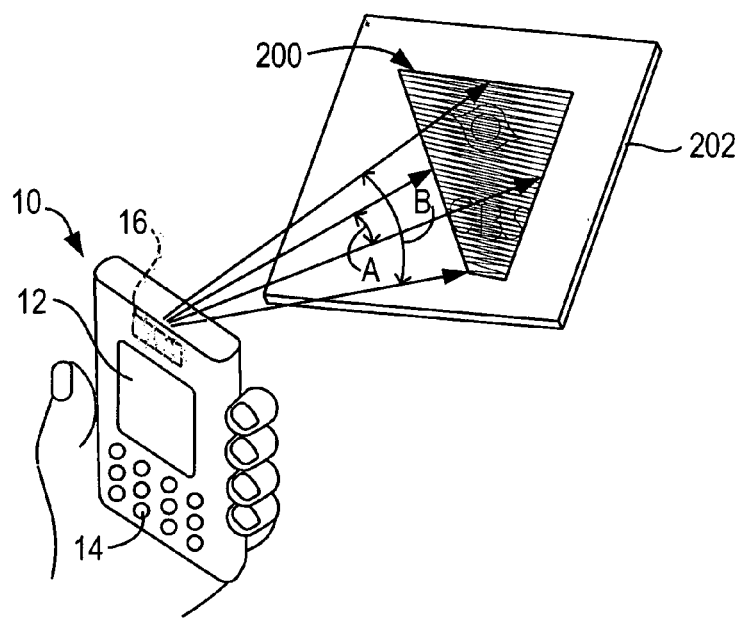
FIG. 8 is a perspective view analogous to FIG. 1, but depicting a keystone-distorted image.

Turning to FIG. 8, a keystone-distorted image 200 is depicted as being projected from the instrument 10 prior to being corrected in accordance with this invention. As shown, the image 200 is projected on a tilted screen 202 where the upper part of the screen is further from the instrument, and the lower part of the screen is closer to the instrument. As a result, the scan lines at the upper part of the screen are longer than the scan lines at the lower part of the screen. If the screen were tilted the other way, then the scan lines at the lower part of the screen would be larger than the scan lines at the upper part of the screen. The screen 202 itself need not be tilted relative to the exit window 16 of the instrument, since the instrument 10 could be oriented at an angle to the screen, or both the screen and the instrument could both be tilted. Thus, the distortion is a function of the different distances and the different scan angles traveled by the laser beam between the second scan mirror 68 and the screen 202. If the laser beam travels a longer distance, then its scan line is longer, and the scan angle over which the laser beam is swept is longer. Longer lines in the projected image are unsatisfactory since a viewer wishes to view the image in a square or a rectangular image area, and not in a trapezoidal area.

Figure 9:
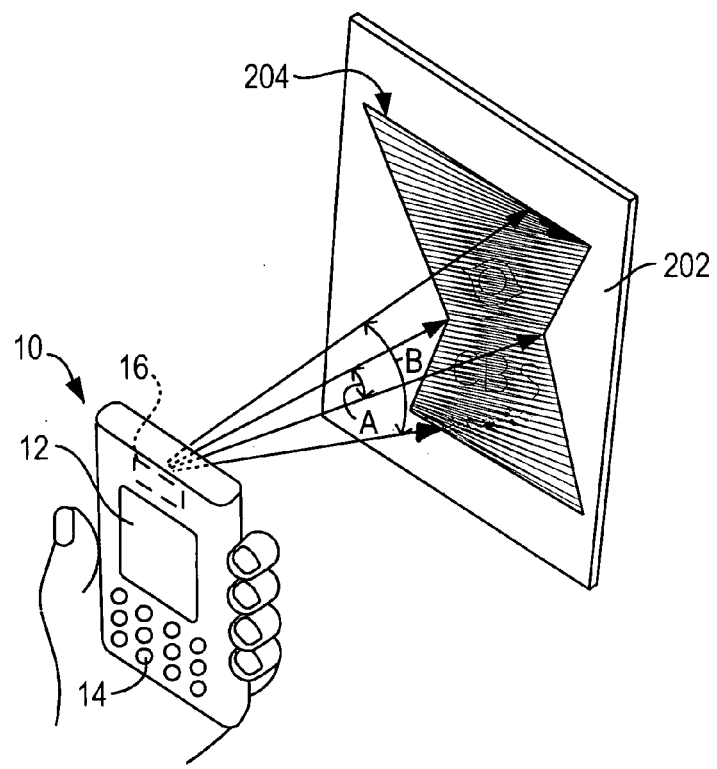
FIG. 9 is a perspective view analogous to FIG. 1, but depicting a pincushion-distorted image.

FIG. 9 depicts a pincushion distorted image 204 prior to being corrected in accordance with this invention. In this case, the screen 202 is parallel to the exit window 16 of the instrument and is perpendicular and located centrally relative to the optical axis along which the laser beam is projected. However, due to the very wide projection angle, e.g., ±30°, the scan lines at the upper and the lower parts of the image 204 are longer than the scan lines at the middle of the image, thereby creating the image with pinched-in sides.

Figure 10:
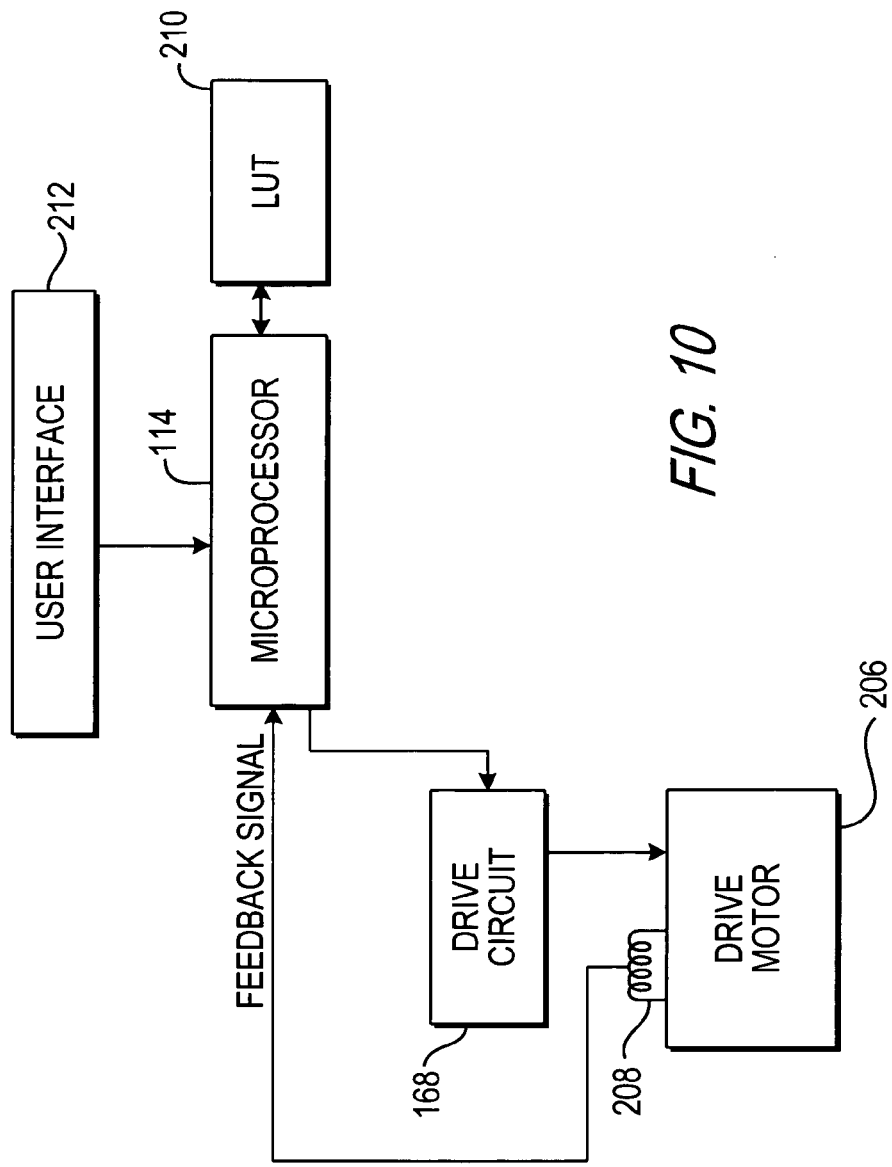
FIG. 10 is a block diagram depicting an arrangement for correcting the distorted images shown in FIGS. 8–9.

In order to correct for such usage distortion, FIG. 10 depicts an arrangement in which the aforementioned microcontroller 114, preferably a microprocessor, is operatively connected to the drive circuit 168 for the first (X-axis) scan mirror 64. The drive circuit 168 generates a drive signal having an amplitude. The drive signal is conducted to a drive motor 206 for the first scan mirror 64. As previously described, in the preferred embodiment, the drive signal is conducted along wires 86, 88 (see FIG. 4) to energize the piezoelectric transducers 82, 84. The greater the amplitude of the drive signal, the greater is the arcuate distance over which the first scan mirror 64 will oscillate, and vice versa.

Figure 5:
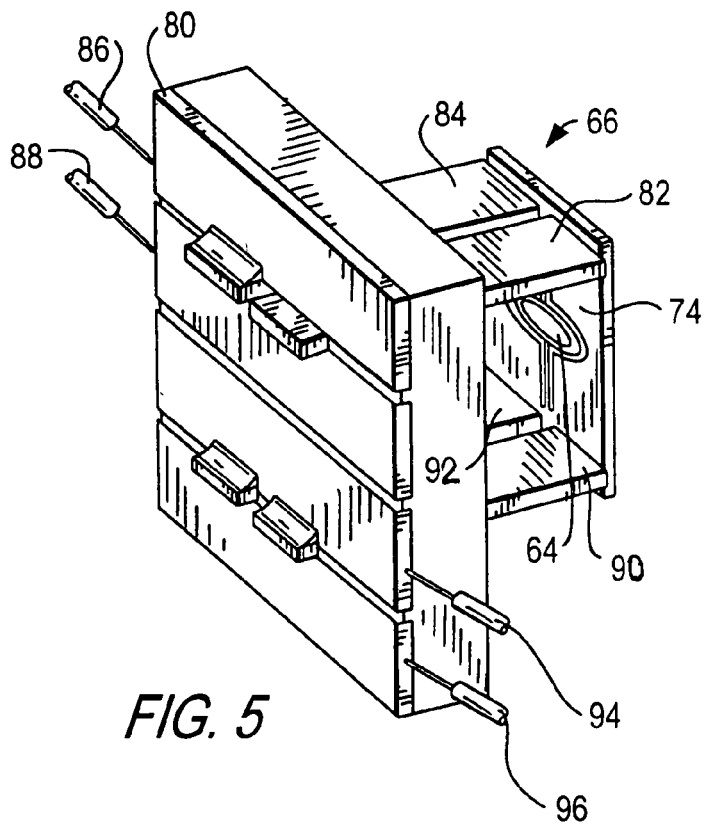
FIG. 5 is a perspective rear view of the inertial drive of FIG. 4.

As also previously described, the piezoelectric transducers 90, 92 in FIG. 5 are used as feedback devices to generate a feedback signal that is conducted along wires 94, 96 to the feedback amplifier 176, the feedback signal having an amplitude corresponding to the amplitude of the drive signal for each scan line. Instead of piezoelectric transducers, again as described above, an electromagnetic feedback coil 208 can be used as the feedback device. The feedback coil 208 generates the feedback signal by magnetic field interaction with a permanent magnet jointly mounted on the first scan mirror 64.

The microprocessor 114 is operative for receiving the feedback signal and measuring the amplitude thereof. By accessing a look-up table (LUT) 210, the microprocessor determines the amplitude of the drive signal and, in turn, the scan angle A. Once the drive signal amplitude is known for each scan line, the microprocessor compares them to one another to determine which scan lines are different in length from the others. The microprocessor then adjusts the amplitude of the drive signal for each scan line to produce scan lines with the same length, thereby correcting for image distortion.

Hence, according to this invention, the drive signal amplitude for the inertial drive 66 that oscillates the first scan mirror 64, or stated differently, the scan angle A over which the first scan mirror 64 is oscillated, is controlled by actively changing the drive signal amplitude (or scan angle) for each scan line during each frame. For example, the drive signal amplitude would be reduced to shorten a scan line that is located further from the instrument than another scan line. In the case of the keystone distortion of FIG. 8, the drive signal amplitude would be controlled to be a linear ramp waveform that repeats for every frame. To correct for both pincushion and keystone distortion, the drive signal amplitude would be controlled to be non-linear.

The amount of correction is preferably user adjustable by a user interface 212 operatively connected to the microprocessor. This interface can be one of the keys on the keypad 14, or a selected touch area on the display 12. No image resolution is lost with this invention, because there is no cropping of pixels.

It will be understood that each of the elements described above, or two or more together, also may find a useful application in other types of constructions differing from the types described above.

While the invention has been illustrated and described as embodied in an arrangement for and a method of correcting for image distortion, especially for use in a color image projection system, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

I claim:

1. An arrangement for correcting distortion of an image projected on a projection surface, comprising:
   a) a laser for emitting a laser beam;
   b) a scanner including a first scan mirror for sweeping the laser beam along a first scan direction to form a scan line on the projection surface, and a second scan mirror for sweeping the scan line along a second scan direction generally orthogonal to the first scan direction to form a raster pattern of scan lines on the projection surface, the scan lines having different lengths along the first scan direction due to different distances traveled by the laser beam between the second scan mirror and the projection surface, each scan line having a number of pixels along the first scan direction;
   c) a drive circuit for driving the first scan mirror with a drive signal having an amplitude;
   d) a feedback circuit for determining the amplitude of the drive signal for each scan line; and
   e) a controller for causing selected pixels to be illuminated, and rendered visible, by the laser beam to produce the image, and for adjusting the amplitude of the drive signal for each scan line to produce the scan lines of the image with the same length, thereby correcting for image distortion.

2. The arrangement of claim 1, and additional lasers for emitting respective laser beams of different wavelengths, and an optical assembly for co-linearly arranging all of the laser beams into a composite beam directed at the first scan mirror.

3. The arrangement of claim 1, wherein the drive circuit is operative for oscillating the first scan mirror in opposite circumferential directions over a first scan angle, and wherein the controller is operative for adjusting the first scan angle as the amplitude of the drive signal is adjusted.

4. The arrangement of claim 1, wherein the controller includes a microprocessor and a look-up table in which values of the amplitude of the drive signal are stored.

5. The arrangement of claim 4, and a user input interface with the microprocessor for manually adjusting the lengths of the scan lines to remove the image distortion.

6. The arrangement of claim 1, wherein the projection surface is a planar screen.

7. A method of correcting distortion of an image projected on a projection surface, comprising the steps of:
   a) emitting a laser beam;
   b) sweeping the laser beam with a first scan mirror along a first scan direction to form a scan line on the projection surface, and sweeping the scan line with a second scan mirror along a second scan direction generally orthogonal to the first scan direction to form a raster pattern of scan lines on the projection surface, the scan lines having different lengths along the first scan direction due to different distances traveled by the laser beam between the second scan mirror and the projection surface, each scan line having a number of pixels along the first scan direction;
   c) driving the first scan mirror with a drive signal having an amplitude;
   d) determining the amplitude of the drive signal for each scan line; and
   e) causing selected pixels to be illuminated, and rendered visible, by the laser beam to produce the image, and adjusting the amplitude of the drive signal for each scan line to produce the scan lines of the image with the same length, thereby correcting for image distortion.

8. The method of claim 7, and emitting respective laser beams of different wavelengths, and co-linearly arranging all of the laser beams into a composite beam directed at the first scan mirror.

9. The method of claim 7, wherein the driving step includes oscillating the first scan mirror in opposite circumferential directions over a first scan angle, and wherein the adjusting step is performed by adjusting the first scan angle as the amplitude of the drive signal is adjusted.

10. The method of claim 7, and storing values of the amplitude of the drive signal in a look-up table.

11. The method of claim 10, and manually adjusting the lengths of the scan lines to remove the image distortion.

* * * * *